United States Patent [19]

Acquaviva

[11] Patent Number: 4,794,429
[45] Date of Patent: Dec. 27, 1988

[54] AUTOMATIC DUAL MODE SHEET AND WEB DOCUMENT TRANSPORT FOR COPIERS

[75] Inventor: Thomas Acquaviva, Penfield, N.Y.

[73] Assignee: Xerox Corporation, Stamford, Conn.

[21] Appl. No.: 29,027

[22] Filed: Mar. 23, 1987

[51] Int. Cl.$^4$ .................. G03B 27/62; G03G 21/00
[52] U.S. Cl. ................................ 355/76; 271/197; 355/3 SH
[58] Field of Search ................. 355/3 SH, 75, 76; 271/197

[56] References Cited

U.S. PATENT DOCUMENTS

| | | | |
|---|---|---|---|
| 4,176,945 | 12/1979 | Holzhauser et al. | 355/23 |
| 4,291,974 | 9/1981 | Silverberg | 355/76 |
| 4,295,737 | 10/1981 | Silverberg | 355/76 |
| 4,400,085 | 8/1983 | Nezu | 355/76 |
| 4,421,306 | 12/1983 | Muka | 271/5 |
| 4,440,492 | 4/1984 | Howard | 355/76 |
| 4,462,527 | 7/1984 | Taylor et al. | 226/15 |
| 4,470,591 | 9/1984 | Acquaviva | 271/245 |
| 4,501,510 | 2/1985 | Andersson | 400/616.3 |
| 4,589,652 | 5/1986 | Silverberg | 271/245 |
| 4,621,801 | 11/1986 | Sanchez | 271/251 |
| 4,635,916 | 1/1987 | Modugno et al. | 271/3 |

*Primary Examiner*—Fred L. Braun

[57] ABSTRACT

In an automatic document handling system for a copier, with a system for feeding and registering document sheets, including a platen transport system, wherein the platen transport system includes a document belt system and a vacuum system for retaining documents against the document belt, there is provided common document input and path systems for feeding either conventional document sheets or computer form or other web (CF) documents, the document belt system relatively low friction belt material, the vacuum system automatically maintaining a first vacuum level high enough to retain the conventional document sheets against the document belt system with sufficient force to resist slippage and function as their primary platen transport system, and a vacuum reduction system for automatically reducing the vacuum to a substantially lower level for CF documents which provides for slippage of CF documents relative to the document belt system, and a separate deskewing and driving system for the CF documents in cooperation with the platen transport system, for deskewing the CF web upstream of the platen and pulling through the platen transport system from downstream thereof, to provide a dual mode system in which the platen transport system provides for low frictional relative movement and an imaging background surface for CF documents, but is not their primary transport. There is a system for automatically sensing the acquisition of CF documents and in response automatically reducing the vacuum level and disengaging additional roller drive systems in the path which normally engage conventionally document sheets.

2 Claims, 2 Drawing Sheets

AUTOMATIC DUAL MODE SHEET AND WEB DOCUMENT TRANSPORT FOR COPIERS

This invention relates to copier document handling, and, more particularly, to automatic dual mode document feeding for presentation to the imaging station of a copier of individual documents to be copied, or computer form web documents to be copied.

The present system provides a dual mode copier document platen transport for both conventional document sheets and elongated web computer form (CF) documents, without requiring a tractor or sprocket drive or separate computer form feeder (CFF) for CF web documents, yet overcoming the very different registration (especially sideways or lateral registration) and deskewing problems of the two very different documents.

With the present system a single integral unit document handler can provide all document handling modes: RDH, ADF, SADH and CFF. This provides a significant simplification of document handling systems and operator usage.

In the exemplary system disclosed herein, for the conventional or cut sheet document mode of operation, sufficient vacuum is applied to the platen transport vacuum & belt system for non-slip document transport, that is, to accept previously deskewed document sheets and drive them straight onto the platen without slippage to a measured stop imaging position. That is, a known leading or trailing edge registration system can be utilized for conventional documents, without slippage between the vacuum belt system and the document. In contrast, in the CF document mode of operation, slippage is automatically provided for the CF web by the over-platen transport, so that the CF web is free to side register against a registration edge and all other drag forces are greatly reduced or eliminated. The CF web can be independently fed by separate deskew and drive transport roller systems at opposite sides of the platen, not primarily by the vacuum belt platen transport. In this CFF mode the belt transport system desirably provides a low friction forward drive and also serves as the overlying white imaging background surface and as a hold-down system for the web segment being imaged, but is not the primary transport. This provides a document handler capable of handling cut sheet or web computer forms in the same DH configuration and with a common platen belt transport system. That is, without requiring a separate CFF or its removal and attachment to the copier when CF web copying is desired, or removal or attachment of a separate DH or components thereof for conventional document copying.

Referring to art of interest, an exemplary low friction belt and vacuum platen transport system, with means for vacuum reduction for document slippage (for a different function), is taught, for example in Xerox Corporation U.S. Pat. No. 4,589,652 issued May 20, 1986 to M. Silverberg (D/85119). Other art is noted therein. DH cross-roller side registration and deskewing is taught, for example in Xerox Corporation U.S. Pat. No. 4,621,801 issued Nov. 11, 1986 to H. J. Sanchez, and other art noted therein. Other DH art noted by way of interest or background includes Xerox Corporation U.S. Pat. No. 4,440,492 issued Apr. 3, 1984 to A. Howard (D/82084) on selectively actuatable vacuum; and U.S. Pat. No. 4,470,591 issued Sept. 11, 1984 to T. Acquaviva (D/82083) on high/low friction belt materials (e.g., Col. 7).

Particularly noted are Xerox Corporation "1075" SADH/CFF (dual document mode—cut sheet or CFF input) document handler system patents, with frictional roller CF feeding and side registration, i.e., any of U.S. Pat. No. 4,462,527 issued July 31, 1984 to T. N. Taylor and S. J. Wenthe, Jr. (D/82108), U.S. Pat. No. 4,526,309 issued July 2, 1985 to T. N. Taylor et al, and U.S. Pat. No. 4,485,949 issued Dec. 4, 1984 to S. A. Gebhart and R. Parks (D/82091).

Other DH art as to reducing the vacuum transport vacuum level and other functions is noted for example in Xerox Corporation U.S. Pat. No. 4,295,737 issued Oct. 20, 1981 to M. Silverberg, especially Col. 6, lines 4–19 (D/78258); and Xerox Corporation U.S. Pat. No. 4,291,974 issued Sept. 29, 1981 to M. Silverberg, especially Col. 6, line 66—Col. 7, line 13 (D/78258Q); and Eastman Kodak Company U.S. Pat. No. 4,421,306 issued Dec. 20, 1983 to R. S. Muka allowing the belt to continue moving while the document is stationary. U.S. Pat. No. 4,501,510 issued Feb. 26, 1985 to L. H. Andersson shows a printer or typewriter feeder with CF or sheet feeding with means to reduce frictional feed pressure.

As xerographic and other copies increase in speed, and become more automatic, it is increasingly important to provide higher speed yet more reliable and more automatic handling of the document sheets being copied, i.e. the input to the copier. It is desirable to feed, accurately register, and copy document sheets of a variety or mixture of sizes, types, weights, materials, conditions and susceptibility to damage, yet with minimal document jamming, wear or damage by the document transporting and registration apparatus, even if the same documents are automatically fed and registered repeatedly, as for recirculating document precollation copying.

Even with slower copying rate copiers, it has become increasingly desirable to provide at least semiautomatic document handling (SADH), allowing an operator to "stream feed" originals into an input of the copier document handler or feeder, or to provide an automatic document handler (ADH) for automatic feeding from a stack of documents, with the document feeder in either case doing the deskewing, feeding and final registration of the documents into the copying position, and then ejecting the documents from the platen automatically.

A preferable document handling system is one that utilizes an existing or generally conventional copier optical imaging system, including the external transparent copying window (known as the platen or imaging station) of the copier. It is also desirable that the document handling system be readily removable, as by pivoting away, to alternatively allow the copier operator to conventionally manually place documents, including books, on the same copying platen. Thus, a lighter weight document handler is desirable. It is also desirable that a document registration edge alignment or positioning system be available for such manual copying which is compatible with that used for the document handler.

Although faster, more accurate, and automatic feeding into and registration of each document at the correct position on the platen to be copied is highly desired, this is difficult to accomplish without skewing (rotating) the document and/or damaging the edge of the document, particularly as it is being stopped. One problem is that documents can vary widely in sheet size, weight, thickness, material, condition, humidity, age, etc.. Documents may even have curls, wrinkles, tears, "dog-ears", cut-outs, overlays, tape, paste-ups, punched holes, staples, adhesive or slippery areas, or other irregularities. Unlike sets of copy sheets, which generally are all from the same new clean batches and therefore of almost exactly the same condition and size, documents often vary considerably even if they are all of the same "standard" size, (e.g. letter size, legal size, A4, B4, etc.). In contrast, documents even in the same set may have come from completely different paper batches or have variably changed size with different age or humidity conditions, etc. Furthermore, the images on documents and their fusing can change the sheet feeding characteristics and these images may be subject to damage in feeding if not properly handled, e.g. smearing of fresh typewriting ink. Yet it is desirable to automatically or semiautomatically rapidly feed, register and copy even a mixture of sizes, types, and conditions of documents without document jams or document damage and with each document correctly and accurately aligned to a desired registration position.

One of the most difficult to achieve features for automatic document handling is the rapid, accurate, reliable, and safe registration of each document at the proper position for copying. Conventionally the document is desirably either center registered or corner registered (depending on the copier) by the document handler automatically at a preset registration position relative to the copier platen. At this registration position two orthogonal edges of the document are aligned with two physical or positional (imaginary) registration lines of the copier platen at which the original document is properly aligned with the copier optics and copy sheet/photoreceptor registration system for correct image transfer of the document image to the photoreceptor and then to the copy sheet. This registration accuracy is desirably consistently within approximately one millimeter. If the document is not properly registered, then undesirable dark borders and/or edge shadow images may appear on the ensuing copy sheet, or information near an edge of the document may be lost, i.e. not copied onto the copy sheet. Document misregistration, especially skewing, can also adversely affect further feeding and/or restacking of the documents.

In preferred types of copying systems the document is registered for copying overlying a selected portion of full sized (full frame) platen which is at least as large as the largest document to be normally copied automatically. In such systems the document is preferably either scanned or flashed while it is held stationary on the platen in the desired registration position. That is, in these full frame systems the document is preferably registered by being stopped and held during imaging at a preset position over the platen glass which is adjacent one side or edge thereof.

As shown in the art, and further discussed below, document handling systems have been provided with various document transports to move the documents over the copier platen and into registration. Such document platen transports may comprise single or plural transport belts or feed wheels, utilizing frictional, vacuum, or electrostatic sheet driving forces. Various combinations of such transports are known with various registration devices or systems. Preferably the same platen transport sheet feeder is used to drive a document onto and off of the platen before and after copying as well as registering the document.

The cited art shows several approaches to registering a document for copying at an appropriate position relative to the transparent copying window. Typically the document is registered on one axis by driving it with a platen transport against a mechanical gate or stop positioned temporarily or permanently at or adjacent one edge of the platen. This is often at or closely adjacent the downstream edge of the platen. That allows unidirectional movement of the document across the platen, entering from the upstream side or edge closely following the proceeding document and ejecting after copying from the downstream side or edge of the platen. The registration gate or stop may comprise projecting aligned fingers, or roller nips, or a single vertical surface along one registration line, against which an edge of the sheet, preferably the leading edge, is driven into abutment to mechanically stop and thereby register the sheet on one axis, in its principal direction of movement. Another function of such mechanical registration is to also deskew the document, i.e., to properly rotate and align it with this registration line as well as to determine and control its registration position.

As disclosed, for example, in U.S. Pat. No. 4,043,665 issued Aug. 23, 1977 to J. R. Caldwell; U.S. Pat. No. 4,132,401 issued Jan. 2, 1979 to J. F. Gauranski, et al; or U.S. Pat. Nos. 4,295,737 or 4,391,505 issued Oct. 20, 1981 and July 5, 1983 to Morton Silverberg, document registration can desirably be done without mechanical document stops on the platen. This can be done by preregistering the document to a platen transport belt with upstream, off-platen, preregistration fingers or rollers, and then moving the document a known, preset, distance over the platen on the belt into registration, providing there is no slippage during this entire movement between the document and the belt.

Alternatively, this can be done by sensing, on the platen or upstream of the platen, with a document edge sensor, the edge of a document being transported onto the platen and then stopping the document platen transport then or after a preset time period or movement to stop the document on the platen. Off-platen document edge sensing (see below) is preferred, since reliable on-platen sensing is more difficult and generally requires special sensors and platen transport modifications or adaptations such as disclosed in said U.S. Pat. Nos. 4,391,505 and in 3,473,035 and 3,674,363. Thus, particularly noted is U.S. Pat. No. 3,674,363 to E. O. Baller et al, issued July 4, 1972, e.g. Cols. 8 and 9, second paragraph, and Col. 10, first paragraph, disclosing sensing the document trail edge upstream of the platen to initiate slowdown and stopping of the platen transport. Said U.S. Pat. No. 3,473,035, issued Oct. 14, 1969 to J. F. Gardner, is particularly noted as to SW1 in FIG. 7 and its description re operator selectable document stopping/shifted imaging positions. A recent measured-stop registration system is taught in U.S. Pat. No. 4,579,444 issued Apr. 1, 1986 to T. S. Pinckney and H. J. Sanchez (D/84074).

The following additional references also apparently sense a document sheet trailing edge as the reference time for initiating a control "count" or fixed distance drive for controlling the document sheet feeding drive on the copier platen: IBM Tech. Discl. Vol. 19, No. 5, Oct. 1976, pp. 1589–1591, and U.S. Pat. Nos. 3,829,083 and 3,936,041, to Shiina et al (Ricoh), and U.S. Pat. No. 4,066,255 issued Jan. 3, 1978 to W. F. Bradbury (Addressograph-Multigraph Corp.), and Xerox Disclosure Journal publications Vol. 2, No. 3, May/June 1977, p. 49, and Vol. 3, No. 2, March/April 1978, pp. 123-124.

U.S. Pat. No. 4,456,237 issued June 26, 1984 to M. H. Buddendeck is cited particularly for its disclosure of an RDH with a solenoid (56) opened document feed roll set (48) nip to provide for optional document reversal by reversible rollers 30 in an RDH document path.

DH registration systems may also utilize multiple belts and document stopping registration fingers into the document path to stop the document at the desired registration position. Examples are disclosed in U.S. Pat. No. 4,589,651 issued May 20, 1986 to M. Silverberg (D/85119Q); U.S. Pat. No. 4,470,591 issued Sept. 11, 1984 to T. Acquaviva; U.S. Pat. No. 4,322,160 issued Mar. 30, 1982 to G. S. Kobus; and U.S. Pat. No. 3,844,522 issued Oct. 29, 1974 to C. D. Bleau et al. One example of a registration gate movable in and out of the document path from above the platen (from inside the document handler) is disclosed in U.S. Pat. No. 4,256,298 issued Mar. 17, 1981 to D. K. Ahern.

Various other examples of document registration fingers or gates are disclosed in numerous other references such as U.S. Pat. No. 4,456,243 issued June 26, 1984 to P. D. Simone, Xerox Disclosure Journal, Vol. 6, No. 5, September/October 1981, pp. 239-240; U.S. Pat. No. 4,400,085 issued Aug. 23, 1983 to T. Nezu; U.S. Pat. No. 4,330,117 issued May 18, 1982 to G. Weisbach; and U.S. Pat. No. 3,072,397 issued Jan. 8, 1983 to H. E. Kelchner.

Examples of U.S. Patents on servo-motor or stepper-motor driven original document feeders in general are U.S. Pat. Nos. 3,888,579; 4,000,943; 4,144,550; 4,283,773 and 4,455,018.

In some document handling systems a system for also side registering (laterally positioning) the document on the platen is used, i.e. aligning the original on both axes while on the platen, e.g. U.S. Pat. No. 4,411,418 or U.S. Pat. No. 4,335,954. However two axes on-platen registration is not required, and such lateral or second axis registration may be done upstream of the platen, as by confinement of the documents within the side guides in the document tray from which the documents are fed, or driving the sheet against a side guide, e.g. U.S. Pat. Nos. 4,257,587; 4,266,762 or 4,381,893.

Examples of document handling systems in which the document is registered on the platen using a fixed (non-retractable) registration stop against which the document is reverse-driven by a transport are disclosed, for example, in U.S. Pat. No. 4,146,220 issued Mar. 27, 1979 to P. Barton; U.S. Pat. No. 3,504,908 issued Apr. 7, 1970 to J. R. Kreuger; and U.S. Pat. No. 4,033,574 issued July 5, 1977 to K. K. Stange. The use of a fixed stop projecting above the plane of the platen as disclosed in such references has the potential for allowing this same registration edge to be utilized for manual registration of a document as well. However, it has the significant disadvantage that if this registration edge is not retracted the document cannot be readily fed over it by the same transport unless part of the transport is lifted. This conventionally limits the document feeding path for a fixed registration edge document handler to one of two reversing document motion types. In one type the document is fed forward onto the platen over an upstream raised registration edge, and then the document belt is reversed in direction, while it is held down, to drive the rear or trail edge of the document into alignment with this upstream fixed registration edge. Then after copying, the document belt must be reversed again to resume its forward motion to eject the document from the downstream side of the platen. Note, e.g., U.S. Pat. No. 3,504,908 cited above. In the other type, the fixed, permanently raised, registration edge is located at the downstream end of the platen. The document is registered by driving it downstream across the platen into the downstream registration edge. Then, after copying, the document transport is reversed in direction to feed the document back off from the upstream end of the platen. A disadvantage of this type is that since the document is being fed off from the same side of the platen from which it was fed on, only one document at a time can be handled by an over-platen document belt transport. That is, the subsequent document cannot be fed onto the platen until the preceding document is ejected from the platen by the belt. With such a "Y" shaped bidirectional platen transport system the documents cannot be recirculated in a unidirectional endless loop to and from the platen. This normally requires either a longer document changing time or a faster document transport.

For the above reasons, the use of retractable registration edges and normally non-reversing transports has been generally preferred for modern high speed document handling systems. This allows the document to be fed off the platen over the retracted registration member while the next document is being fed on with the same, unidirectional, transport.

In the description herein the term "document" or "sheet" refers to a usually flimsy sheet of paper, plastic, or other such conventional individual image substrate, and not to microfilm or electronic images which are generally much easier to manipulate. It is important to distinguish electronic copying systems, such as the Xerox "9700" which read and store images of documents electronically and create copies by writing on a photoreceptor with a laser beam, or the like, since they do not have the problems dealt with here.

The "document" here is the sheet (original or previous copy) being copied in the copier onto the outputted "copy sheet", or "copy". Related plural sheets of documents or copies are referred to as a "set". A "simplex" document or copy sheet is one having an image and page on only one side or face of the sheet, whereas a "duplex" document or copy sheet has a "page", and normally an image, on both sides. The "page numbers" are, of course, not necessarily actual numbers printed on the pages. Nor are document sheet numbers referenced herein specific sheets.

The present invention is suitable for either precollation copying, i.e. automatically plurally recirculated document set copying provided by a recirculating document handling system or "RDH"; or nonprecollation, or postcollation, copying, such as semiautomatic document handling (SADH) as discussed above, or almost any automatic document feeder (ADF).

Precollation, collation, recirculative, or RDH copying, as it is variably called, is a known desirable feature for a copier. It provides a number of important known advantages. In such precollation copying any desired number of collated copy sets or books may be made by making a corresponding number of recirculations of the set of documents in collated order past the copier imaging station and copying each document page (normally only once) each time it circulates over the imaging station. The copies therefrom may automatically exit the copier processor in proper order for stacking and offsetting as precollated sets, and thus do not require subsequent collation in a sorter or collator. On-line finishing (stapling, and/or gluing, or other binding and stacking) and/or removal of completed copy sets may thus be provided while further copy sets are being made in further circulations of the same document set.

In the known conventional (nonsignature printing) copy art, as in the normal operation of the Xerox Corporation "1090" copier, it is known to provide a recirculating document handler (RDH) to recirculate document sheets to and from a stack thereof on an automatic duplex copier (and to invert duplex documents) to provide collated duplex copy sheet sets. Automatic on-line finishing thereof as by compiling, stapling, stiching and/or gluing is provided. Some examples of Xerox Corporation U.S. RDH Patents are U.S. Pat. No. 4,459,013 issued July 10, 1984 to T. J. Hamlin et al, U.S. Pat. No. 4,278,344 issued July 14, 1981 to R. B. Sahay, and U.S. Pat. Nos. 4,579,444,325 or 326. Some other examples of recirculating document handlers are disclosed in U.S. Pats. Nos. 4,076,408; 4,176,945; 4,428,667; 4,330,197; 4,466,733 and 4,544,148. A preferred vacuum corrugating feeder air knife, and a tray, for an RDH are disclosed in U.S. Pat. Nos. 4,418,905 and 4,462,586. An integral semi-automatic and computer form feeder (SADH/CFF), which may be an integral part of an RDH, as noted in Col. 2, paragraph 2, therein, is disclosed in U.S. Pat. No. 4,462,527. Various others of these patents, such as U.S. Pat. No. 4,176,945 above, issued Dec. 4, 1979 to R. Holzhauser (Kodak) teach plural mode, e.g. RDH/SADH, document handlers. A system for using an RDH to more efficiently copy small document sets of only two documents is taught in U.S. Pat. No. 4,468,114, issued Aug. 28, 1984 to S. Pells, et al (Xerox).

However, a disadvantage of such precollation copying systems is that the documents must be repeatedly separated and circulated sequentially for copying in a predetermined order a number of times equivalent to the desired number of copy sets. Thus, increased document handling is necessitated for a precollation copying system, as compared to a post collation copying system. Therefore, maximizing document handling automation while minimizing document wear or damage is particularly important in precollation copying.

In contrast, in a postcollation copying system, such as with an ADH or SADH, plural copies may be made at one time from each document page and colalted by being placed in separate sorter bins. Thus, the document set need only be circulated (or manually or semiautomatically fed) to the imaging station once if the number of copy sets being made is less than the number of available sorter bins. A disadvantage is that the number of copy sets which can be made in one document set circulation is limited by the number of available sorter bins. Also, a sorter adds space and complexity and is not well suited for on-line finishing. However, postcollation copying, or even manual document placement, is desirable in certain copying situations to minimize document handling, particularly for delicate, valuable, thick or irregular documents, or for a very large number of copy sets. Thus, it is desirable that a document handler for a precollation copying system be compatible with, and alternatively usable for, postcollation and manual copying as well.

The art of original document sheet handling for copiers has been intensively pursued in recent years. Various systems have been provided for automatic or semi- automatic feeding of document sheets to and over the imaging station of the copier for copying. The documents are normally fed over the surface of an imaging station comprising a transparent platen, into a registered copying position on the platen, and then off the platen. Such automatic or semiautomatic document handlers eliminate the need for the operator to place and align each document on the platen by hand. This is a highly desirable feature for copiers. Document handlers can automatically feed documents as fast as they can be copied, which cannot be done manually with higher speed copiers, thus enabling the full utilization or productivity of higher speed copiers.

The present system is usable with various document handlers, e.g., RDH, SADH, ADF and/or ADH systems, or plural mode units. Yet the present system does not significantly increase conventional document handling complexity or cost in compatibly achieving this additional function.

The present invention overcomes various of the above-discussed problems of plural document copying registration for copiers, and provides various of the above features and advantages.

A feature of the specific embodiment disclosed herein is to provide a method and apparatus for an automatic document handling system for a copier, with means for feeding and registering document sheets to the imaging station platen of the copier, including a platen transport system for transporting the documents over the platen and providing an imaging background surface, wherein said platen transport system includes a document belt system and a vacuum system for retaining documents against the document belt system, the improvement comprising:

common input means for inputting either conventional document sheet documents or continuous computer form web documents to said automatic document handling system, common document path means for feeding either conventional document sheets or continuous computer form web documents from said input means over said imaging station platen of the copier through said platen transport system, said document belt system comprising relatively low friction belt material, said vacuum system comprising vacuum means for automatically maintaining a first vacuum level in said vacuum system high enough to retain said conventional document sheets against the document belt system with sufficient force to resist slippage of said conventional document sheets relative to said document belt system so that said document belt platen transport system functions as the primary platen transport system for said conventional document sheets, vacuum reduction means for automatically reducing the vacuum level in said vacuum system to a second vacuum level substantially lower than said first vacuum level for said continuous computer form web documents, which second vacuum level provides for slippage of said continuous computer form web documents relative to said document belt system, and separate computer form web deskewing and driving means for feeding said continuous computer form web documents over said platen in cooperation with said platen transport system, to provide a dual mode document handling system in which said platen transport system provides for low frictional relative movement and an imaging background surface for said continuous computer form web documents, but is not the primary platen transport system for said continuous computer form web documents.

Further features provided by the system disclosed herein, individually or in combination, include: means for automatically sensing the acquisition of continuous computer form web documents by said document handling system, and wherein said vacuum reduction means for automatically reducing the vacuum level in said vacuum system is actuated automatically in response to said sensing;

wherein said separate computer form web deskewing and driving means includes non-slip drive roller means downstream from said platen transport system for pulling said continuous computer form web documents, and wherein said sensing means senses the acquisition of continuous computer form web documents by said non-slip drive roller means;

wherein said document handling system includes additional roller drive means in said common document path means for engaging said conventional document sheets adjacent said platen transport system, which additional roller drive means are automatically disengaged in response to said sensing of the acquisition of continuous computer form web documents by said document handling system;

a method of automatic document handling for a copier, for registering and feeding documents over the imaging station platen of the copier, and providing an imaging background surface, with an automatic document handling system including a document belt platen transport system, including a method of applying a vacuum to the documents over the platen for retaining the documents against the document belt platen transport system, the improvement comprising the steps of:

alternatively inputting conventional documents sheets and continuous computer form web documents to the same input of said automatic document handling system;

alternatively feeding said inputted conventional document sheets and continous computer form web documents over said imaging station platen through said same document belt platen transport system;

when said conventional document sheets are so inputted, automatically maintaining a first level of said vacuum for retaining said conventional document sheet documents against said document belt platen transport system with sufficient force to resist slippage of said conventional document sheets relative to said document belt platen transport system so that said document belt platen transport system functions as the primary platen transport for said conventional document sheets;

when said continuous computer form web documents are so inputted, automatically reducing the level of said vacuum to a second vacuum level substantially lower than said first vacuum level, which second vacuum level allows slippage of said continuous computer form web documents relative to said document belt platen transport system, and separately deskewing and driving said continuous computer form web documents over said platen with feeding means separate from said document belt system;

to provide a dual mode document handling system in which said document belt platen transport system provides for low frictional movement and an imaging background surface for said continuous computer form web documents, but is not the primary platen transport system for continuous computer form web documents;

further including the step of automatically sensing the acquisition of said continuous computer form web documents by said separate feeding means, and reducing said vacuum to said second level in response to said sensing;

wherein said continuous computer form web documents are deskewed upstream of said document belt platen transport system and pulled through said document belt platen transport system from downstream thereof by said separate feeding means.

Some examples of various other prior art copiers with document handlers, and especially with control systems therefor, including document sheet detecting switches, etc., are disclosed in U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, and 4,475,156. It is well known in this art, and in general, how to program and execute document handler and copier control functions and logic with conventional or simple software instructions for conventional microprocessors. This is taught by the above and other patents and various commercial copiers. Such software may vary depending on the particular function and particular microprocessor or microcomputer system utilized, of course, but will be available to or readily programmable by those skilled in the applicable arts without experimentation from either descriptions or prior knowledge of the desired functions together with general knowledge in the general software and computer arts. It is also known that conventional or specified document handling functions and controls may be alternatively conventionally provided utilizing various other known or suitable logic or switching systems.

All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example below. The present invention will be better understood by reference to this description of this embodiment thereof, including the drawing figures (approximately to scale), wherein.

Describing now in further detail the specific example illustrated in the Figures, there is shown a copier 10 with a document handling system 20, (preferably an RDH to be described herein) both somewhat similar in part to that disclosed in the above-cited U.S. Pat. No. 4,469,319 and other patents referenced, but specifically modified and adapted for dual document feeding as described herein. It provides for automatically transporting either individual registered and spaced document sheets onto and over the conventional platen imaging station 23 of the copier 10; or for feeding and sequential copying of segments of a continuous web document.

Figure 1:
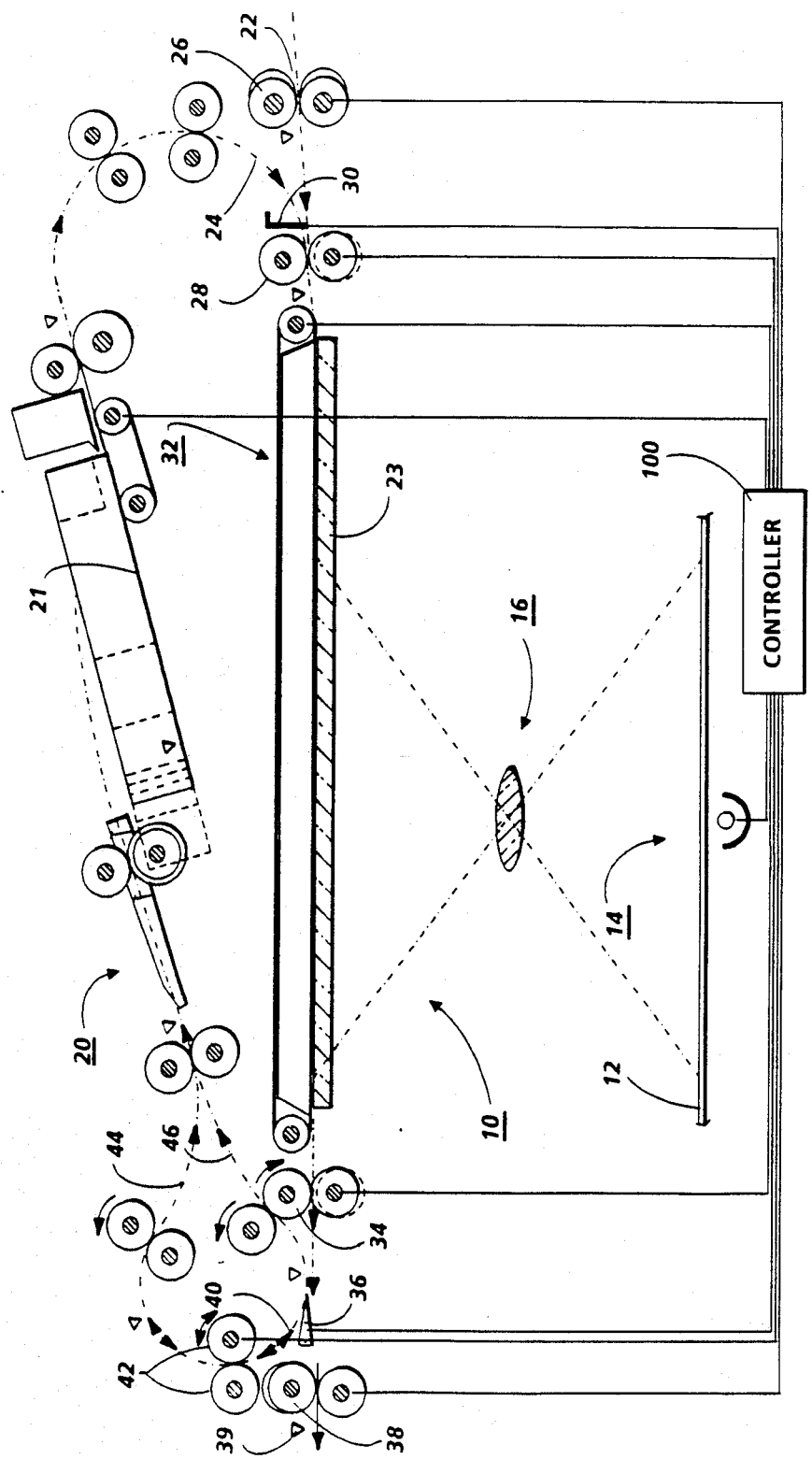
FIG. 1 is a side view of an exemplary document handler for a copier, incorporating the system of the invention (in this example, a simplex/duplex dual mode RDH/SADH, shown being used with a conventional document)

The document handling (DH) system 20 illustrated in FIG. 1 is exemplary, and may be readily modified for different copiers. It has two separate document inputs, a recirculating or RDH input stacking tray 21 on top, and an SADH side entrance 22 for semiautomatic document handling, especially for larger documents, which may be optionally inserted short edge first there, or undersize documents.

Other than the DH 20 document system modifications and controls and other features to be described herein, the exemplary copier 10 may be, e.g., the well known "Xerox" "1075" or "1090" or any other xerographic copier, as illustrated and described in patents cited above, including U.S. Pat. No. 4,278,344 and others. The exemplary copier 10 may conventionally include a xerographic photoreceptor belt 12 and the conventional xerographic stations acting thereon for respectively charging, image exposing at 14, image developing, etc.. Documents on the platen 23 are imaged onto the photoreceptor 12 at 14 through a variable reduction ratio optical imaging system 16 to fit the document images to the selected size of copy sheets. The copier 10 is adapted to provide duplex or simplex precollated or postcollated copy sets from either duplex or simplex original documents copied from the same RDH 20.

The control of all sheet feeding is, conventionally, by the machine controller 100. The controller 100 is preferably a known programmable microprocessor, exemplified by the previously cited art. The controller 100 conventionally controls all of the machine steps and functions described herein including the operation of the document feeder 20, the document and copy sheet gates, the feeder drives, etc.. As further taught in those references, the controller 100 also conventionally provides for storage and comparison of the counts of the copy sheets, the number of documents recirculated in a document set, the desired number of copy sets and other selections by the operator through the panel of switches thereon, time delays, jam correction control, etc..

Figure 3:
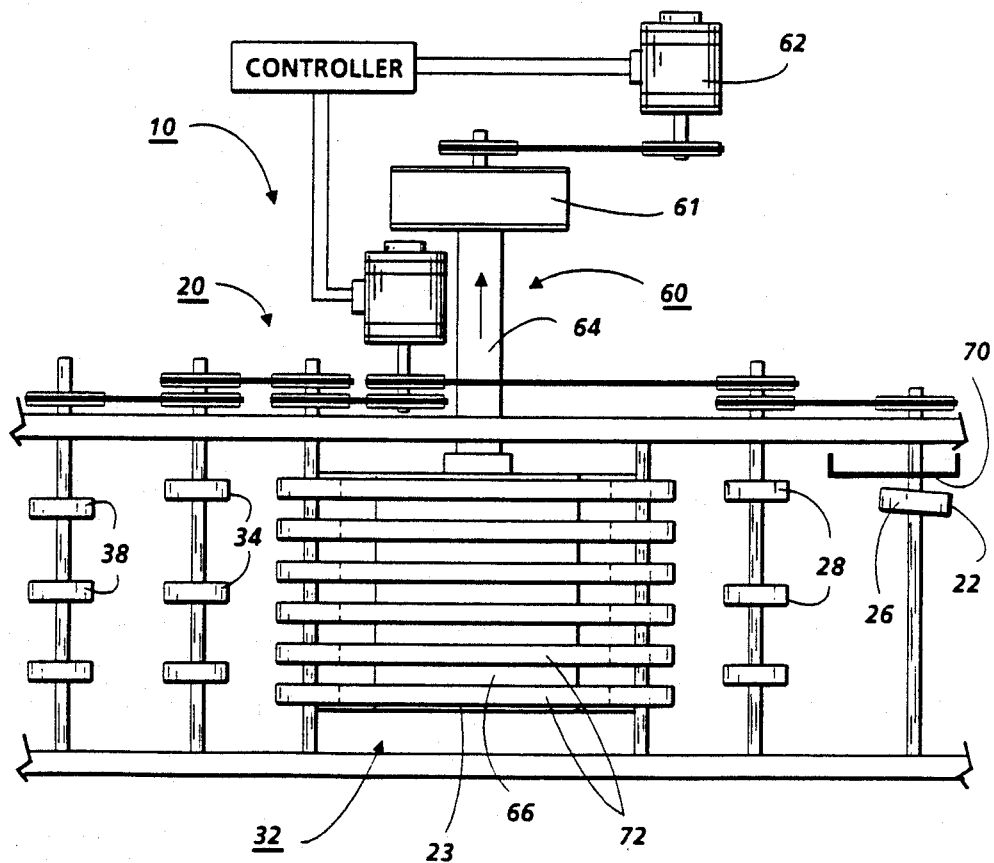
FIG. 3 is a top view of the apparatus of FIG. 2.

Referring further to the exemplary plural mode document handling system 20 illustrated in FIG. 1, it may be seen that input documents may be fed to the same input or preregistration gate 30 from either the SADH input 22 or from the RDH tray 21 through an RDH input path 24. The gate 30 may have any of the various specific configurations and operating mechanisms illustrated in various of the above-noted prior art references on registration gate systems. It is retractable in and out of the document path preferably by solenoid actuation controlled by the controller 100. It is positioned at the common or intersecting point of input of the RDH input 24 and the SADH input 22, as illustrated in FIG. 1. The SADH input 22 includes slightly skewed cross-rollers 26 which, as taught in the above-cited U.S. Pat. No. 4,579,444 provides side edge registration (at edge guide 70—see FIG. 3) as well as feeding of the document forward for registration and deskewing against the gate 30. Such rollers may also be provided in the RDH input path 24. Just downstream of the gate 30 are take-away or on-platen rollers 28 providing a document sheet feeding nip for engaging and transporting any portion of the document sheet which is past the gate 30. They feed the documents directly into the platen transport system 32, which comprises plural vacuum belts for engaging and transporting the documents without slippage over the platen 23 into the desired registration position. The platen transport system 32 and the rollers 28 may be incrementally servo motor driven by the controller 100 in a manner taught by various of the above-cited references.

After the documents are copied on the platen 23, they are, in this system, ejected into downstream or off-platen rollers 34 and onto a decision gate 36. If the gate 36 is up it deflects the documents to a document output or ejector including output rollers 38 and sensor 39. If the decision gate 36 is down, documents are deflected into an RDH return path 40. However, this RDH return path 40 includes reversible rollers 42 to provide a choice of two return paths to the RDH tray 21; a simplex return path 44 with an inversion in the path, or a duplex return path 46 without inversion in that path. The duplex return path 46 provides desired inversion of duplex documents as returned to the tray 21 for a subsequent circulation or circulations, described in the above-cited art. This is because the duplex document has had only one inversion per circulation, only in the RDH input path 24. In contrast, in the total simplex circulation path there are two inversions per circulation, which equals no inversion, because the total simplex recirculation path includes one inversion in each of the paths 24 and 44.

It will be noted that the respective document paths include various sensors for sensing the lead edge and/or trail edge of the document sheets, schematically illustrated in FIG. 1 by the conventional representation of an arrowhead or triangle. All of these sensors are, of course, conventionally connected to the controller 100 to be utilized in the operation of the DH system 20.

As illustrated, the RDH tray 21 includes a variable position rear registration edge or backstop, illustrated here with several dashed lines, for initially accommodating and restacking various sizes of documents. The illustrated DH system 20 utilizes for its RDH feeding a known combined corrugated vacuum feeding and air knife separator system for feeding out sequentially the bottom-most sheet of the stack in the tray 21, as described in various of the above-cited references.

Figure 2:
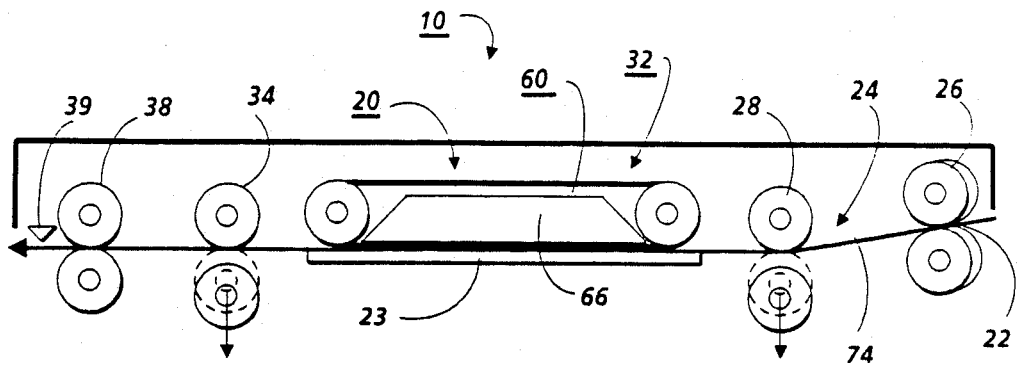
FIG. 2 is a schematic side illustration of the platen transport of the document handler of FIG. 1, operating to feed and present a computer form web document to the platen.

As shown in the Figures, for normal or cut sheet document feeding in the DH system 20 the sheets are inputted at the SADH tray or guide input 22, or from the RDH input path 24 from RDH tray 21, which has its own cross-rollers. The SADH input 22 path includes the side (rear edge) registering cross-rollers 26. This same SADH input 22 is desirably commonly used here for CF web input also, since it provides for basically planar or straight through web feeding of the CF web 74, as shown in FIG. 2.

For normal or cut sheet SADH input 22 document feeding in the DH system 20, the documents are fed and controlled by, in order, the cross-rollers 26, the nips of the on-roll rollers 28, the platen vacuum belt transport 32, the nips of the downstream or off-roll rollers 34, and then the nips of the output or exit roll rollers 38.

In the system here, the portions of all of these roller pairs 26, 28, 34 and 38 below the document path are idler rollers mounted to the body of the copier. All the above-path rollers in each of these nip pairs are the driven rollers, and all of those are mounted to the pivotal unit of the DH system 20. Thus, these above-path rollers may all be lifted up, away from the platen 23, to expose it and to open all these roller nips along with the opening of the platen transport. Furthermore, the below-path idlers of the rollers 28 and 34 are movable by motor/cam or solenoid retractors to the dashed-line positions shown in FIG. 2, or FIG. 1, so as to open those nips even when the DH system 20 is pivoted down into its closed, operating, position. The idler shaft repositioning system mechanism may be conventional.

This opening of the on-roll 28 and off-roll 34 nips is done automatically as part of the CFF mode of operation. This may be done by the controller 100 automatically applying or removing electrical power to the idler rolls repositioning system when CFF feeding is selected and a document sensor 39 adjacent the nip of the downstream exit rollers 38 senses that the CF has been acquired by that nip. By opening those nips for CF web feeding, only the exit roll 38 nips are hard-engaged on the CF web 74, desirably pulling the web 74 through the DH system under only the feeding control of that nip 38. The input skewed cross-rolls 26 also remain engaged on the CF web 74, but that nip is designed to slip and to not overfeed or buckle the web 74. However, the input skewed rolls 26 continue to urge the web 74 laterally back against the input edge guide 70 to maintain rear edge registration of the web during its feeding.

As an additional, optional, feature, for assistance in urging and maintaining said CF web rear edge registration for very long webs, the shaft of the exit rolls 38 may be very slightly angled to the document path. Or, the driving roll diameters may be made slightly larger at the front than the rear. Either can induce a slight rearward skewing movement force on the web 74, as described in the above-cited U.S. Pat. No. 4,462,527 issued July 31, 1984 to T. N. Taylor and S.J. Wenthe, Jr..

The vacuum for the exemplary platen transport system 32 here may be provided by a conventional vacuum system 60 including a conventional DH vacuum blower 61 driven by a motor 62 when the blower motor 62 is turned on by the controller 100. A vacuum duct 64 pneumatically connects the blower 61 to the manifold or plenum 66 overlying the platen 23. As shown, for example, in the above-cited U.S. Pat. No. 4,589,652 issued May 20, 1986 to M. Silverberg, the vacuum may be applied to the documents via apertures in the lower surface of the plenum 66 through the spaces between the plural platen transport belts 72 to hold the document against these low-friction platen transport belts 72 with a normal force sufficient to prevent relative slippage therebetween as long as this high vacuum level is applied by the vacuum system 60. The vacuum level appropriate for this will depend on the particular belt material, spacing, etc.. The level indicated in the above-cited patent is in the order of 8 mm of water for belts with a coefficient of friction of approximately 0.3–0.35.

However, in the system here, when CFF feeding is selected, and a document sensor 39 adjacent the nip of the downstream exit rollers 38 senses that the CF has been acquired by that nip, the controller 100 automatically removes electrical power from the blower motor 62 to remove the applied vacuum, and thereby greatly reduce the normal force between the platen transport belts 72 and the CF document.

Thus, in the conventional or cut sheet document mode, documents are deskewed at the platen transport entrance, transported, controlled-stop registered, and removed from the platen, all by relatively high vacuum level application to the document sheet through relatively low friction material belts. The high vacuum level holds the document with a high normal force against the belts, sufficient to prevent relative slippage. In contrast, in the CFF mode the belts 72 are free to slip and normally only somewhat assist in transporting the continuous web panels. [However, if desired, the high vacuum may be left on for just the initial feed-in of the initial CF web segment or panel, as described.]

To summarize, in the CFF mode operation, the first web panel is preferably manually inserted into the known rear edge registration and deskewing system 26 and 70 at the auxiliary SADH input 22 of the RDH, which deskews it. The side registration guide 70 is only in the document input area. Then, when the initial web panel has passed over the platen, the vacuum may be removed, so that another set of non-slip feed rolls 38 adjacent the platen exit, along with said skewed feed rolls 26 adjacent the platen entry, can maintain alignment of the rear side of the web panel to the rear registration position. Note that, desirably, there is no registration edge on or over or against the edge of the platen 23, and thus no source of edge drag skewing forces there. Since the web is being driven by only one set of drive rolls 38, and not by the platen transport belts 72 (since the vacuum normal force is greatly reduced), nor the other (now opened) roller nips, what would otherwise be inherent cumulative web-damaging problems with even small speed differentials therebetween are eliminated with this system. Yet the document feeding path, hardware, and operations for CFF are largely common and fully compatible with the very different feeding requirements for much shorter conventional individual sheets which must be "handed off" from one feeding nip to another along the document path with very restricted slippage to ensure positive and registered feeding.

In order for both these preplaten 26 and post platen 38 rollers to function properly and to prevent excessive frictional drag of the CF web against the rear edge platen registration guide 70, and other drag forces, the web must be free to slip laterally relative to the platen transport belt system. This is provided both by using a greatly reduced or eliminated vacuum force on the document, so that it is only loosely engaged with the transport belt or belts, and also because these belts 72 are of relatively low surface friction material such as Mylar TM or other relatively low friction materials. A suitable exemplary low friction belt system and vacuum system (and alternative means for vacuum reduction) is taught, for example, in the above-cited U.S. Pat. No. 4,589,672 issued May 20, 1986 to M. Silverberg.

Once the CF web is under the control of (nipped by) both sets of rollers 26 and 38, at the platen input and output sides, the belts 72 still continue to move at substantially the same speed as these nips, incrementally cycling at the proper acceleration, speed and deceleration for each web segment or panel advance. But the web advance is actually under the primary control of the output roll 38 nips, not the belts 72. The downstream roll 38 nips are hard nips pulling the web without slippage, whereas the upstream roll 26 nip is providing deskewing and provides slippage, so that only one roller speed is controlling and no buckling or tearing forces can be exerted on the web.

Thus, in the CFF mode, the belt system serves as a low friction secondary or assist drive, and as a white backup or image background surface to reduce show-around or show-through copy defects, but not as a high driving force device as it does for cut sheet documents.

The incremental CFF advance and forward or web segment registration driving of the downstream rollers 38 is preferably controlled by the controller 100 by CF sprocket hole counting and registration, as described for example in the above-cited U.S. Pat. No. 4,485,949 issued Dec. 4, 1984 to S.A. Gebhart and R. Parks.

It will be noted in contrast to the present system, that if an attempt were made to use a normally high friction platen transport as a dual mode CFF transport, that the platen transport belts and other high friction members would have to be completely removed somehow from the over-platen document path, because even if they were idled they would still present a high sideways drag resistance force, and perhaps even tear the web by resisting side registration forces from the roller drives.

While the embodiment disclosed herein is preferred, it will be appreciated from this teaching that various alternatives, modifications, variations or improvements therein may be made by those skilled in the art, which are intended to be encompassed by the following claims:

What is claimed is:

1. In an automatic document handling system for a copier, with means for feeding and registering document sheets to the imaging station platen of the copier, including a platen transport system for transporting the documents over the platen and providing an imaging background surface, wherein said platen transport system includes a document belt system and a vacuum system for retaining documents against the document belt system, the improvement comprising:

common input means for inputting either conventional document sheet documents or continuous computer form web documents to said automatic document handling system;

common document path means for feeding either conventional document sheets or continuous computer form web documents from said input means over said imaging station platen of the copier through said platen transport system;

said document belt system comprising relatively low friction belt material;

said vacuum system comprising vacuum means for automatically maintaining a first vacuum level in said vacuum system high enough to retain said conventional document sheets against the document belt system with sufficient force to resist slippage of said conventional document sheets relative to said document belt system so that said document belt platen transport system functions as the primary platen transport system for said conventional document sheets;

vacuum reduction means for automatically reducing the vacuum level in said vacuum system to a second vacuum level substantially lower than said first vacuum level for said continuous computer form web documents, which second vacuum level provides for slippage of said continuous computer form web documents relative to said document belt system;

and separate computer form web deskewing and driving means for feeding said continuous computer form web documents over said platen in cooperation with said platen transport system;

to provide a dual mode document handling system in which said platen transport system provides for low frictional relative movement and an imaging background surface for said continuous computer form web documents, but is not the primary platen transport system for said continuous computer form web documents;

further including means for automatically sensing the acquisition of continuous computer form web documents by said document handling system, and wherein said vacuum reduction means for automatically reducing the vacuum level in said vacuum system is acutated automatically in response to said sensing;

wherein said document handling system includes additional roller drive means in said common document path means for engaging said conventional document sheets adjacent said platen transport system, which additional roller drive means are automatically disengaged in response to said sensing of the acquisition of continuous computer form web documents by said document handling system.

2. The automatic document handling system of claim 1, wherein said separate computer form web deskewing and driving means includes non-slip drive roller means downstream from said platen transport system for pulling said continuous computer form web documents, and wherein said sensing means senses the acquisition of continuous computer form web documents by said non-slip drive roller means.

* * * * *